(12) United States Patent
Wittenberg et al.

(10) Patent No.: US 7,905,407 B2
(45) Date of Patent: Mar. 15, 2011

(54) ELECTRO-OPTICAL LENS MOUNTING ASSEMBLY AND METHOD IN ELECTRO-OPTICAL READERS

(75) Inventors: Carl Wittenberg, Water Mill, NY (US); Mark Drzymala, Commack, NY (US); Chinh Tan, Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 228 days.

(21) Appl. No.: 12/313,173

(22) Filed: Nov. 18, 2008

(65) Prior Publication Data

US 2010/0123007 A1    May 20, 2010

(51) Int. Cl.
*G06K 7/10* (2006.01)
*G06K 7/14* (2006.01)

(52) U.S. Cl. .................. 235/454; 235/459; 235/462.14; 235/462.32; 235/462.35; 235/462.43; 235/472.01; 235/472.02; 235/472.03; 359/19; 359/30; 359/355; 359/362

(58) Field of Classification Search .................. 235/454, 235/459, 462.01–462.09, 472.01–472.03, 235/462.14, 462.32, 462.35, 462.43; 359/19, 30, 355, 362

See application file for complete search history.

(56) References Cited

U.S. PATENT DOCUMENTS

| | | | |
|---|---|---|---|
| 6,098,887 A * | 8/2000 | Figarella et al. | 235/472.01 |
| 6,250,550 B1 * | 6/2001 | Winarski et al. | 235/383 |
| 6,437,925 B1 * | 8/2002 | Nishioka | 359/726 |
| 2005/0199720 A1 * | 9/2005 | Barkan | 235/454 |
| 2005/0199725 A1 * | 9/2005 | Craen et al. | 235/462.22 |
| 2008/0100933 A1 * | 5/2008 | Yuan | 359/820 |

* cited by examiner

*Primary Examiner* — Thien M. Le
*Assistant Examiner* — Tuyen K Vo (57) ABSTRACT

A lensholder holds at least one fixed optical lens and a variable focusing element in a spaced relation along an optical path through which light passes in an electro-optical reader. The variable focusing element has a pair of electrodes across which a voltage is applied to optically modify the light passing through the fixed optical lens and the variable focusing element. The lensholder directly electrically conductively contacts the electrodes and establishes an electrically conductive path between each electrode and an exterior of the lensholder.

20 Claims, 5 Drawing Sheets

ELECTRO-OPTICAL LENS MOUNTING ASSEMBLY AND METHOD IN ELECTRO-OPTICAL READERS

DESCRIPTION OF THE RELATED ART

Solid-state imaging systems or imaging readers, as well as moving laser beam readers or laser scanners, have both been used to electro-optically read one-dimensional bar code symbols, particularly of the Universal Product Code (UPC) type, each having a row of bars and spaces spaced apart along a scan direction, and two-dimensional symbols, such as Code 49, which introduced the concept of vertically stacking a plurality of rows of bar and space patterns in a single symbol, as described in U.S. Pat. No. 4,794,239. Another two-dimensional code structure for increasing the amount of data that can be represented or stored on a given amount of surface area is known as PDF417 and is described in U.S. Pat. No. 5,304,786.

The imaging reader includes a solid-state imager or sensor having all array of cells or photosensors, which correspond to image elements or pixels in a field of view of the imager, and an imaging lens assembly for capturing return light scattered and/or reflected from the symbol being imaged. Such an imager may include a one- or two-dimensional charge coupled device (CCD) or a complementary metal oxide semiconductor (CMOS) device and associated circuits for producing electronic signals corresponding to a one- or two-dimensional array of pixel information over the field of view.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

Laser beam readers generally include a laser for emitting a laser beam, a focusing lens assembly for focusing the laser beam to form a beam spot having a certain size at a predetermined working distance, a scan component for repetitively scanning the beam spot across a symbol in a scan pattern, for example, a line or a series of lines across the symbol, a photodetector for detecting return light reflected and/or scattered from the symbol and for converting the detected light into an analog electrical signal, and signal processing circuitry including a digitizer for digitizing the analog signal, and a microprocessor or controller for decoding the digitized signal based upon a specific symbology used for the symbol into data indicative of the symbol.

It is desirable that the symbol be capable of being imaged or scanned over an extended range of working distances relative to the reader. It is conventional to move one or more lenses in the imaging lens assembly of the imaging reader and, in turn, to move imaging planes at which the symbol is located and imaged between a near position close to the reader and a far position further away from the reader. It is also conventional to move one or more lenses in the focusing lens assembly of the moving laser beam reader and, in turn, to move the focus of the laser beam between the near and far positions. This lens movement is typically performed mechanically. This is disadvantageous for several reasons. First, the mechanical movement generates vibrations that are propagated through the reader to a user's hand in a handheld mode of operation, may also generate dust to obscure the respective lens assembly, and may cause reader component wear especially over time. Moreover, the vibrations call generate objectionable, annoying, audible hum. In addition, the lens movement requires a drive that, in turn, consumes electrical power, is expensive and slow, can be unreliable, occupies space and increases the overall weight, size, wear and complexity of the reader.

To avoid such mechanical movement, a variable focus liquid lens based on an electrowetting effect has been proposed in U.S. Pat. Nos. 7,201,318 and 7,264,162 for use in both imaging and moving laser beam electro-optical readers, in which an electrical voltage is applied to the liquid lens across two electrodes to change an optical property, e.g., a focal length, thereof. It has further been proposed, for example, in U.S. Pat. Nos. 4,190,330, 5,305,731, and 6,859,333 to achieve variable focusing using liquid crystal (LC) materials and cells of the type used in optical displays.

As advantageous as these variable focusing elements have been in avoiding the drawbacks of mechanical movement, they have not proven to be readily incorporated or mated with fixed optical lenses, especially in compact, miniature readers that have little room available to accommodate the respective lens assembly. For example, electrical connectors are used to make electrical connections to the electrodes of the above-identified variable focus electrowetting-type liquid lens. These electrical connectors typically take the form of metal contacts, washers or clips and constitute discrete conductive elements that occupy the available little room, and also space the fixed optical lenses at a small, but non-negligible, distance further away from the liquid lens. For good optical coupling efficiency, for maximum light throughput and for maximizing the utilization of the available room for the respective light assembly, the fixed optical lenses should be as close as possible to, and not undesirably spaced farther apart from, the liquid lens. Accordingly, it would be desirable to eliminate such discrete electrical connectors.

SUMMARY OF THE INVENTION

One feature of this invention resides, briefly stated, in an electro-optical mounting assembly, and a method of mounting components, in an electro-optical reader operative for reading a target, such as one- and/or two-dimensional bar code symbols, as well as non-symbols. The assembly includes a variable focusing element having a pair of electrodes across which a voltage is applied to optically modify light passing along an optical path through the variable focusing element. Advantageously, the variable focusing element is a liquid lens of the electrowetting type that includes a liquid having a shape that changes when the voltage is applied across the electrodes. The variable focusing element could also be of the liquid crystal (LC) type that changes its index of refraction to optically modify light passing therethrough when voltage is applied across its electrodes. The assembly further includes at least one fixed optical lens, and preferably a plurality of fixed optical lenses, arranged along the optical path. A lensholder is operative for holding the fixed lens or lenses and the focusing element in a spiced relation along the optical path.

In accordance with one aspect of this invention, the lensholder directly electrically conductively contacts the electrodes and establishes an electrically conductive path between each electrode and an exterior of the lensholder. The direct contact enables the discrete electrical connectors, such as the metal contacts, washers or clips of the prior art, to be eliminated, and enables the fixed optical lenses to be mounted closer to, and not undesirably spaced farther apart from, the variable focusing element. This enhances optical coupling efficiency, enhances light throughput and maximizes the utilization of the available room for the assembly, especially in compact, miniature readers that have little room available to accommodate such electro-optical assemblies.

In a preferred embodiment, the lensholder includes a lens barrel in which the fixed lens or lenses are mounted, and a cap mounted on the lens barrel for holding the focusing element between the lens barrel and the cap. A resilient washer is preferably positioned between the focusing element and the cap for constantly pressing the focusing element against the lens barrel. The lens barrel is constituted of an electrically conductive material, typically a metal, such as brass, and is coated with an electrically insulating coating, except at an interior uncoated surface that is in direct contact with one of the electrodes, and except at an exterior uncoated surface at an exterior of the lens barrel. The coating is typically a black coating that absorbs stray light. The cap is constituted of an electrically insulating material, typically plastic, and is plated with an electrically conductive plating at an interior plated surface that is in direct contact with the other of the electrodes, and at an exterior plated surface at an exterior of the cap. The plating is typically a metal.

Advantageously, the exterior uncoated surface at the exterior of the lens barrel is annular and concentric with the exterior of the optical path, and the exterior plated surface at the exterior of the cap is annular and concentric with the optical path. The reader includes a controller for applying the voltage across the exterior uncoated surface of the lens barrel and the exterior plated surface of the cap. This voltage is conducted along respective conductive paths to the electrodes to optically modify the light passing through the lenses and the variable focusing element. In the case of an imaging reader, a solid-state sensor or imager, such as a CCD or a CMOS array, is operative for receiving the light passing through the lenses and the variable focusing element from different imaging planes. In the case of a moving laser beam reader, the laser beam passing through the lenses and the variable focusing element to the target is focused at different focal planes. The changing between different focal planes and different imaging planes is performed without mechanically or physically moving solid lenses, thereby decreasing the noise, vibration, wear and dust in such readers, as well as the size, weight, power and volume requirements.

The method of mounting electro-optical components in the electro-optical reader is performed by holding at least one fixed lens and a variable focusing element having electrodes in a spaced relation along an optical path with a lensholder, directly electrically conductively contacting each of the electrodes with the lensholder, and establishing with the lensholder an electrically conductive path between each electrode and an exterior of the lensholder. The electrically conductive path conducts a voltage that optically modifies light passing along the optical path through the fixed lens and the variable focusing element.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
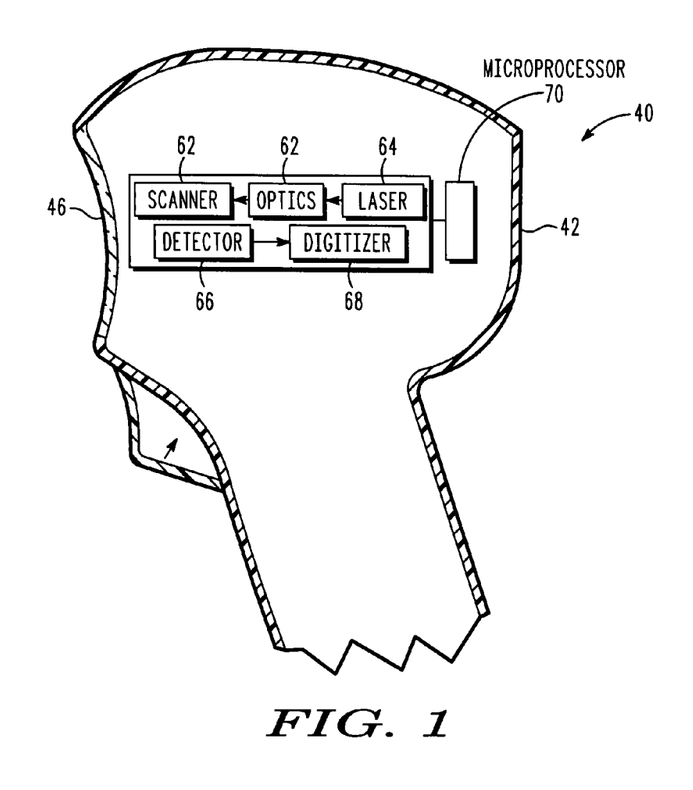
FIG. 1 is a schematic diagram of a handheld moving laser beam reader for reading a bar code symbol that can benefit from this invention.

FIG. 1 depicts a moving laser beam reader 40 for electro-optically reading indicia, such as a symbol, that may use, and benefit from, the present invention. The beam reader 40 includes a scanner 62 in a housing 42 for scanning an outgoing laser beam from a laser 64 and/or a field of view of a light detector or photodiode 66 in a scan pattern, typically comprised of one or more scan lines, through a window 46 across the symbol for reflection or scattering therefrom as return light detected by the photodiode 66 during reading. The beam reader 40 also includes a focusing lens assembly or optics 61 for optically modifying the outgoing laser beam to have a large depth of field, and a digitizer 68 for converting an electrical analog signal generated by the detector 66 from the return light into a digital signal for subsequent decoding by a microprocessor or controller 70 into data indicative of the symbol being read.

Figure 2:
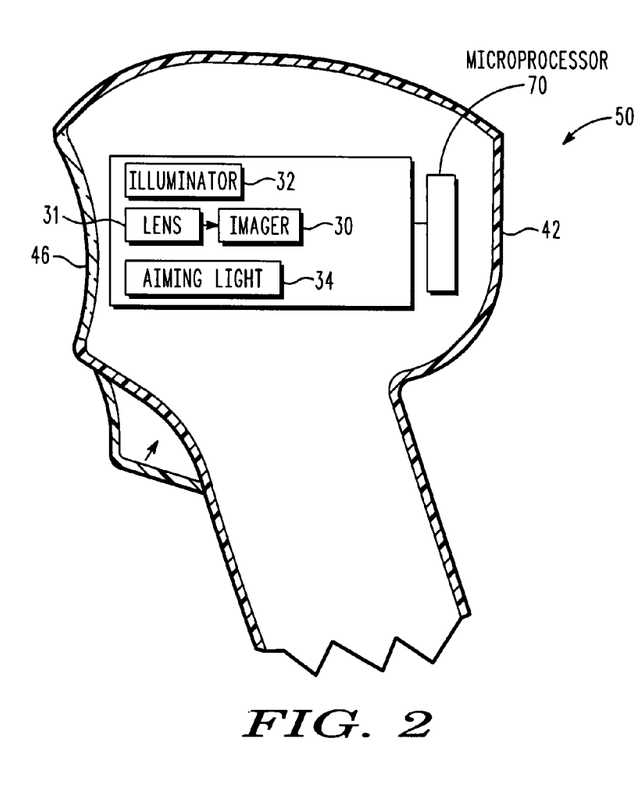
FIG. 2 is a schematic diagram of a handheld imaging reader for imaging a target that can benefit from this invention.

FIG. 2 depicts a imaging reader 50 for imaging targets, such as indicia or symbols to be electro-optically read, as well as non-symbols, that may use, and benefit from, the present invention. The imaging reader 50 includes a one- or two-dimensional, solid-state imager 30, preferably a CCD or a CMOS array, mounted in the housing 42. The imager 30 has an array of image sensors operative, together with an imaging lens assembly 31, for capturing return light reflected and/or scattered from the target through the window 46 during the imaging to produce an electrical signal indicative of a captured image for subsequent decoding by the controller 70 into data indicative of the symbol being read, or processing into a picture of the target.

When the reader 50 is operated in low light or dark ambient environments, the imaging reader 50 includes an illuminator 32 for illuminating the target during the imaging with illumination light directed from an illumination light source through the window 46. Thus, the return light may be derived from the illumination light and/or ambient light. The illumination light source comprises one or more light emitting diodes (LEDs). An aiming light generator 34 may also be provided for projecting an aiming light pattern or mark on the target prior to imaging.

In operation of the imaging reader 50, the controller 70 sends a command signal to pulse the illuminator LEDs 32 for a short time period, say 500 microseconds or less, and energizes the imager 30 during an exposure time period of a frame to collect light from the target during said time period. A typical array needs about 16 to 33 milliseconds to read the entire target image and operates at a frame rate of about 30 to 60 frames per second. The array may have on the order of one million addressable image sensors.

Figure 3:
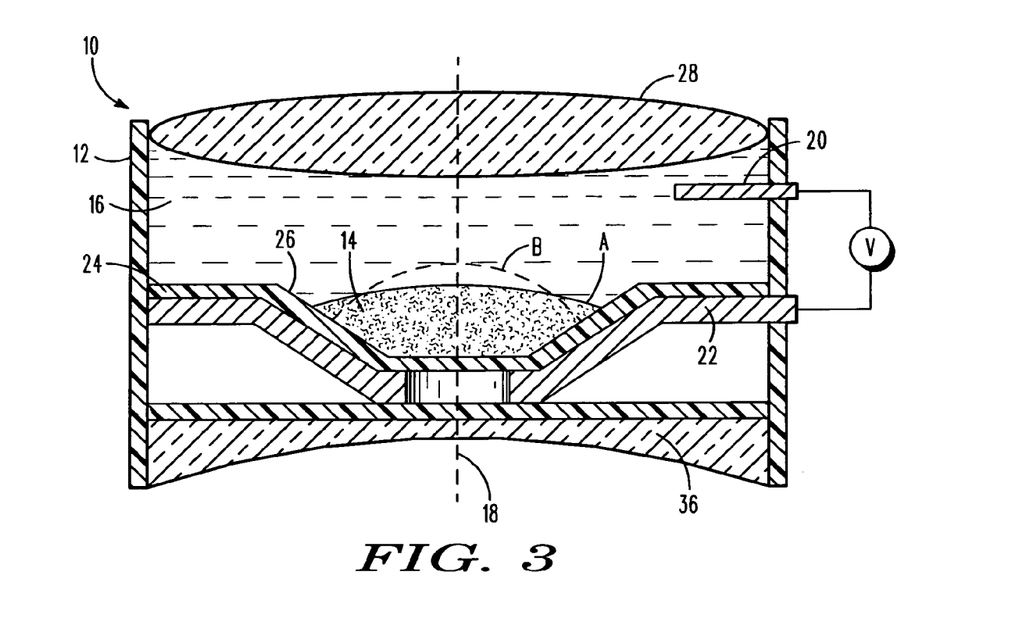
FIG. 3 is a sectional view of a variable focusing element for use in the reader of FIG. 1 or FIG. 2.
Figure 4:
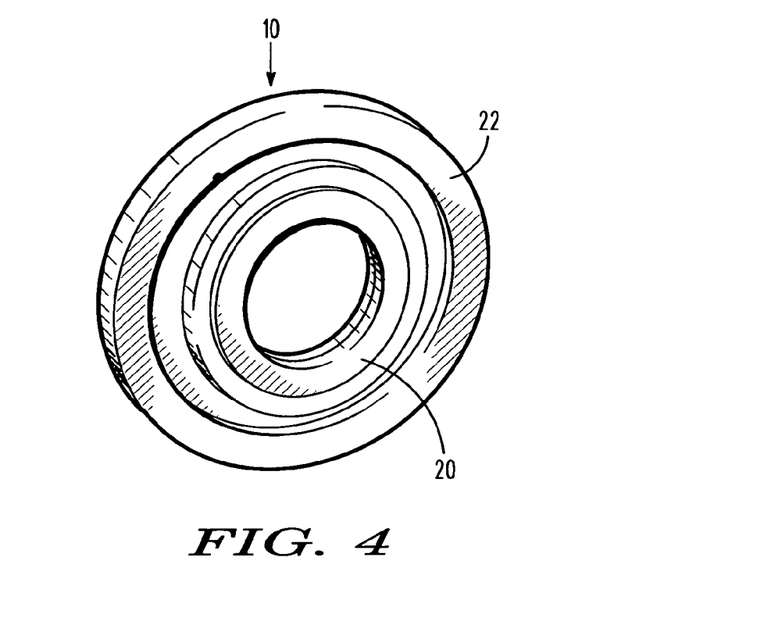
FIG. 4 is a perspective view of the variable focusing element of FIG. 3.

In accordance with this invention, the focusing lens assembly 61 or the imaging lens assembly 31 is configured with a variable focusing element, e.g., an electrowetting liquid lens 10, as shown in isolation in the sectional view of FIG. 3 and in a perspective view in FIG. 4. The liquid lens 10 has a housing 12 in which a first liquid 14, shown in droplet form, and a second liquid 16 are arranged along an optical path 18 that extends toward an indicia such as a symbol or target to be read. The liquids 14, 16 are light-transmissive, immiscible, of different optical indices of refraction, and of a substantially same density. The liquid or drop 14 is constituted of an electrically insulating substance. For example, an oil, an alcane, or a blend of alcanes, preferably halogenated, or any other insulating liquid may be used for the drop 14. The liquid 16 is constituted of an electrically conductive substance, for example, water loaded with salts (mineral or other), or any other liquid, organic or not, and preferably made conductive by the addition of ionic components.

The housing 12 is constituted of an electrically insulating, light-transmissive, material, such as glass, preferably treated with silane or coated with a fluorinated polymer, or a laminate of fluorinated polymer, epoxy resin and polyethylene. The housing 12 includes a dielectric wall 24, preferably having a well 26 in which the drop 14 is accommodated in symmetrical relation relative to the optical path or axis 18. The wall 24 normally has a low wetting characteristic compared to the drop 14, but a surface treatment insures a high wetting characteristic and maintains a centered position of the drop 14 and prevents the drop from spreading. The well 26 further helps to prevent such spreading.

A first electrode 20 extends into the liquid 16, and a second electrode 22 is located below the wall 24. The electrodes 20, 22 are connected to a voltage source V and, as shown in FIG. 4, are exteriorly accessible. When a voltage is applied across the electrodes, as explained in U.S. Pat. No. 6,369,954, the entire contents of which are incorporated herein by reference thereto, an electrical field is created which alters the wetting characteristic of the wall 48 with respect to the drop 42. The wetting increases substantially in the presence of all electrical field.

With no voltage applied, the drop 14 takes the generally hemispherical shape in a rest state shown in solid lines in FIG. 3, and its outer surface "A" is convex. When a voltage is applied, the wetting of the dielectric wall 24 increases, and the drop 14 deforms and takes the shape shown in dashed lines in FIG. 3, and its outer surface "B" is more convex with a smaller radius of curvature. This deformation of the drop changes the focus of the lens 10 and is employed to adjust the focal length of the focusing lens assembly 61 to position the focal plane on the target over a range of working distances, or to adjust the focal length of the imaging lens assembly 31 to position the imaging plane on the target over a range of working distances.

By way of example, the drop 14 in the rest state has a diameter of about 6 mm. If the liquid 16 is salt water, its index of refraction is about 1.35. If the drop 14 is oil, its index of refraction is about 1.45. About 40 diopters of focus variation can be applied for an applied voltage of about 40 v RMS. The response time of the liquid lens 10 is several hundredths of a second, in which case, if a periodic voltage is used, the frequency can be between 50 Hz and 10 kHz so that its period is smaller than the response time.

The liquid lens 10 may also have a fixed convex lens 28 at one axial end region, and a fixed concave, or plano-concave, lens 36 at the opposite axial end region. These fixed lenses may be part of the overall focusing lens assembly 61 or the imaging lens assembly 31 and assist in minimizing any kind of aberrations, for example, chromatic aberrations. The lenses 28, 36 may be replaced by planar, light-transmissive windows, in which event, other fixed lenses in the assemblies 31, 61 assume the function of the lenses 28, 36.

As described so far, the change in curvature of the drop 14 is between two convex curvatures A, B but could also be deformed between different curvatures. For example, it is possible that the outer surface of the drop 14 could be a meniscus, that is concave in the rest state, generally flat to focus the light at a first focal plane when a first voltage is applied, and convex to focus the light at a second focal plane when a second, different voltage is applied.

The voltage is preferably periodic, preferably a square wave drive voltage. The square wave is easily created with a variable duty cycle by the microprocessor 70 having a built-in pulse width modulator circuit. The drive voltage could also be sinusoidal or a triangular wave signal, in which case, the amplitude of the voltage controls the shape of the drop 14 and, in turn, the focal length and the working distance. The square wave does not require a voltage as high as a sinusoidal wave for a given change in focal length. For example, many readers use a single 5 volt power supply. The variable lens requires much more than 5 volts and, hence, a higher voltage must be generated within the reader to drive the variable lens. The lower this generated voltage needs to be, the lower the cost of the voltage generation circuitry.

When a square wave is used, focal length changes are achieved by varying the duty cycle. When a sinusoidal wave is used, focal length changes are obtained by varying the drive voltage amplitude. The amplitude or the duty cycle can be changed in discrete steps (digital manner) or continuously (analog manner) by the microprocessor or controller 70. The voltage could also be a constant DC voltage. The controller 70 may operate to apply the periodic voltage to the variable lens 10 at all times, or at selected times. Thus, the voltage can be applied for each scan, or for every other scan, etc. The voltage can be applied not only during scanning, but even afterward. The voltage can be initiated at the pull of a trigger, or only after a symbol has been detected. The voltage can be applied automatically, or only after a signal analyzer, preferably a microprocessor, has determined that the symbol being scanned has not yet been successfully decoded and read.

Figure 5:
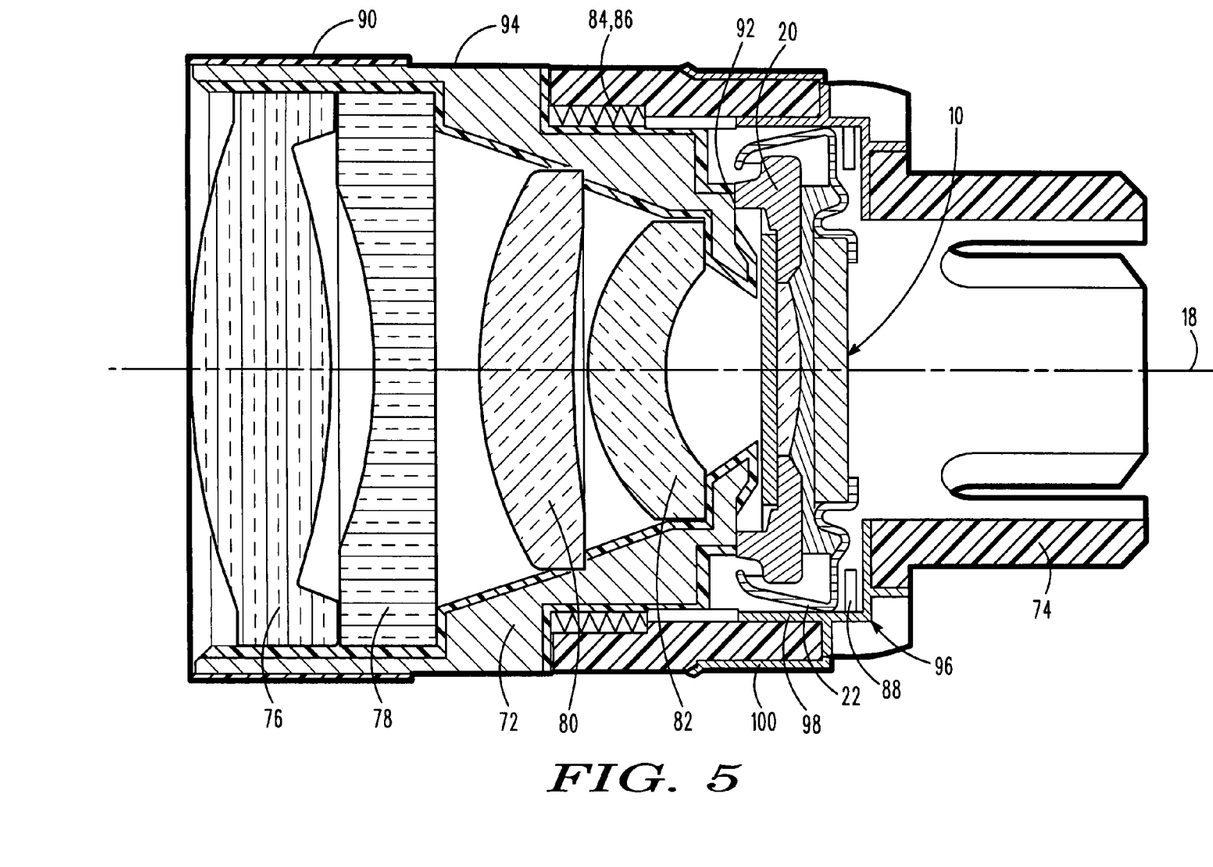
FIG. 5 is a sectional view of an assembly using the variable focusing element of FIG. 4 for use in the reader of FIG. 1 or FIG. 2.
Figure 6:
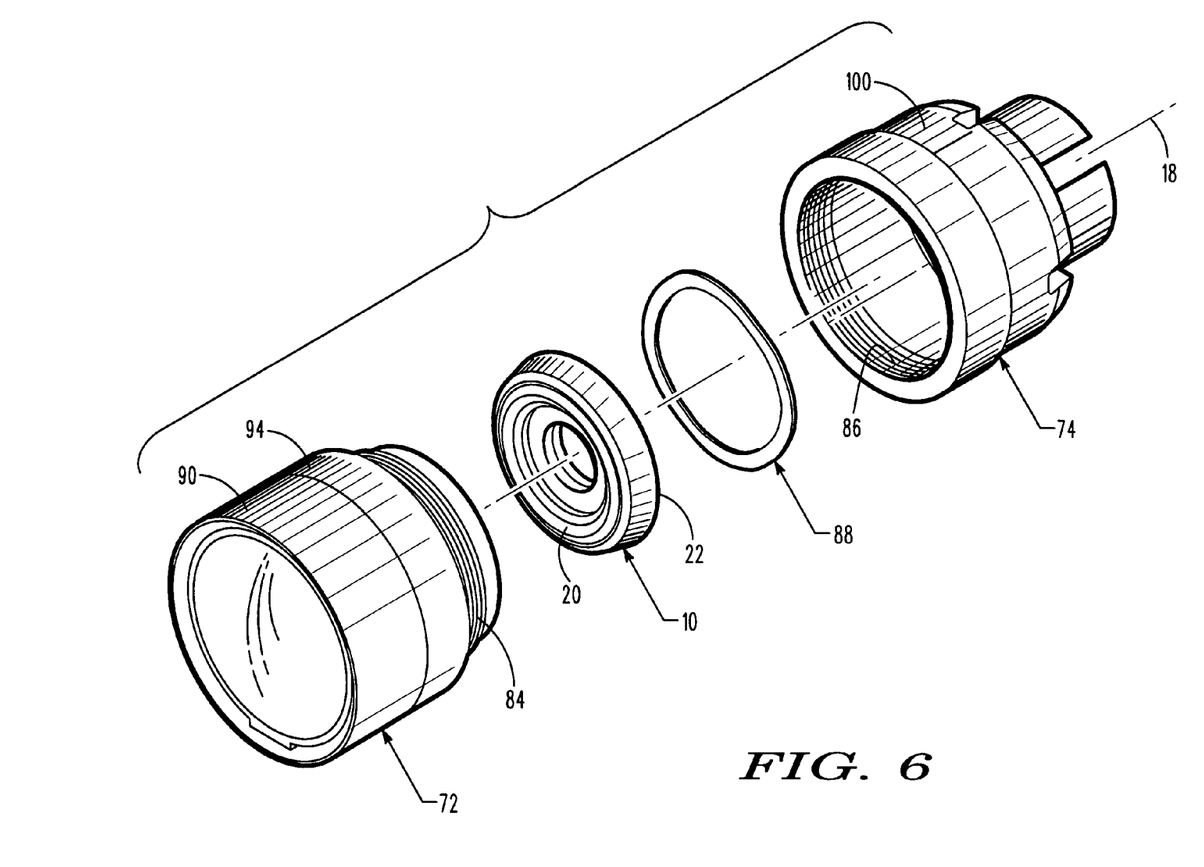
FIG. 6 is an exploded perspective view of the assembly of FIG. 5.

As shown in FIGS. 5-6, each lens assembly 31, 61 includes a lensholder having a cylindrical lens barrel 72 in which a fixed optical lens or a plurality of fixed optical lenses 76, 78, 80 and 82 are mounted in a fixed spaced relation along the optical path 18, and a cylindrical cap 74 mounted on the lens barrel 72 for holding the focusing element 10 in the optical path 18 between the lens barrel 72 and the cap 74. The lens barrel 72 has an external threaded section 84 (see FIG. 6), and the cap 74 has an internal threaded section 86 (see FIG. 6) that threadedly engages the threaded section 84 in the assembled condition shown in FIG. 5. A resilient metal wave washer 88 is preferably positioned between the focusing element 10 and the cap 74 for constantly pressing the focusing element 10 against the lens barrel 72.

In a preferred embodiment, the lens barrel 72 is constituted of an electrically conductive material, typically a metal, such as brass, and is coated with an electrically insulating coating 90, except at an interior annular uncoated surface 92 that is in direct contact with one of the electrodes, e.g., electrode 20,.and except at an exterior annular uncoated surface 94 at an exterior of the lens barrel 72. The coating 90 is typically a black optical coating that absorbs stray light. The coating 90 is preferably selectively removed from the uncoated surfaces 92, 94 to expose the conductive material of the lens barrel 72. A first electrically conductive path has thus been established through the lens barrel 72 between the uncoated surfaces 92, 94.

In the preferred embodiment, the cap 74 is constituted of an electrically insulating material, such as a molded plastic, and is selectively plated with an electrically conductive plating 96 at an interior annular plated surface 98 that is in direct contact with the other of the electrodes, e.g., electrode 22, and at an exterior annular plated surface 100 at an exterior of the cap 74. The plating 96 is typically metal. A second electrically conductive path has thus been established on the cap 74 between the plated surfaces 98, 100.

In accordance with this invention, the lensholder 72, 74 directly electrically conductively contacts the electrodes 20, 22 and establishes an electrically conductive path between each electrode 20, 22 and the exterior of the lensholder 72, 74. The lensholder 72, 74 has previously only been used to hold lenses and has not been used as part of an electrical circuit, and certainly not to apply a voltage to a variable focusing element having electrodes. The direct contact between the lensholder 72, 74 and the electrodes 20, 22 enables the discrete electrical connectors, such as the metal contacts, washers or clips, of the prior art, to be eliminated, and enables the fixed optical lenses 76, 78, 80 and 82 to be mounted closer to, and not undesirably spaced farther apart from, the variable focusing element 10. This enhances optical coupling efficiency, enhances light throughput and maximizes the utilization of the available room for the assembly, especially in compact, miniature readers that have little room available to accommodate such electro-optical assemblies.

Figure 7:
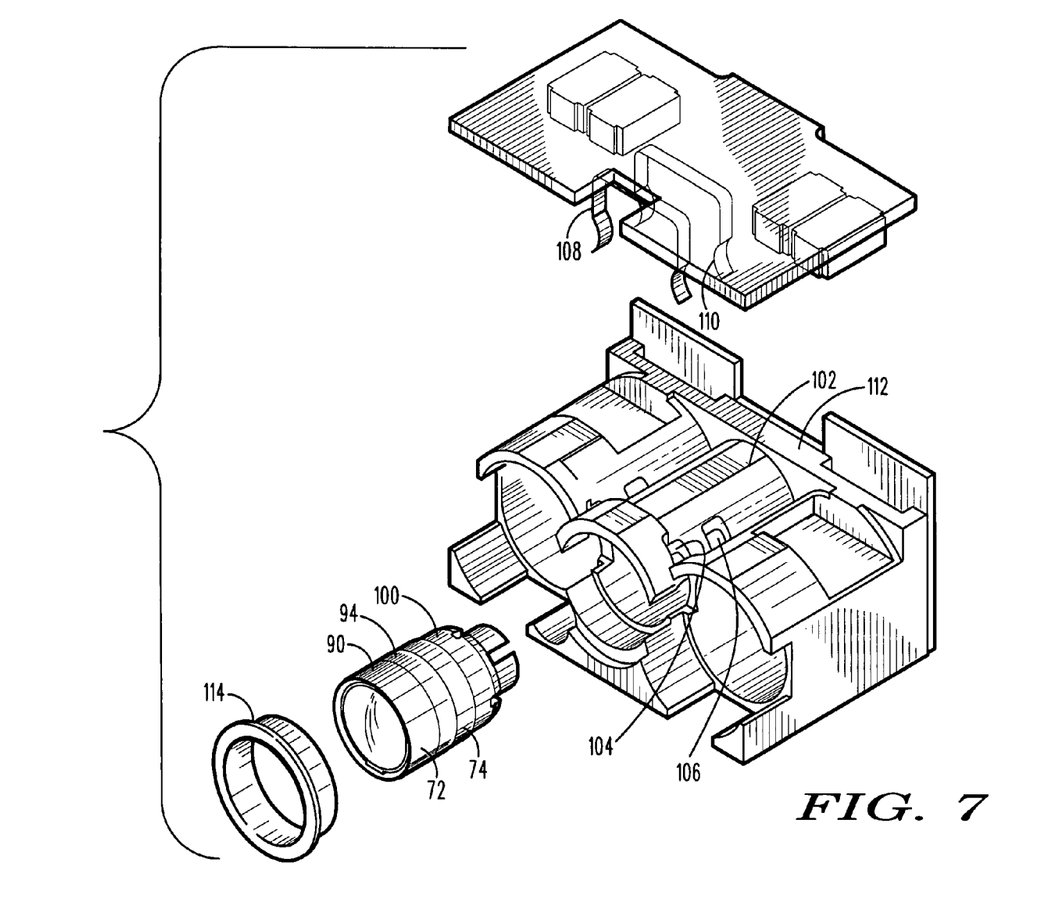
FIG. 7 is an exploded view of the assembly of FIG. 5 in the reader of FIG. 2.

As shown in FIG. 7, the exterior uncoated surface 94 at the exterior of the lens barrel 72 is annular and concentric with the optical path, and the exterior plated surface 100 at the exterior of the cap 74 is annular and concentric with the optical path. The assembly is inserted into a tubular sleeve 102 having channels 104, 106 through which electrically conductive resilient straps 108, 110 are respectively inserted to straddle and make electrical contact with the exterior surfaces 98, 100. The annular exterior surfaces 94, 100 allow the assembly to be inserted into the sleeve 102 without regard to angular position of the lensholder about the optical path. A plug 114 maintains the assembly in the sleeve 102. The controller 70 applies the voltage across the straps 108, 110 and, in turn, across the exterior uncoated surface 94 of the lens barrel 72 and the exterior plated surface 100 of the cap 74 and, in turn, across the electrodes 20. 23 to optically modify the light passing through the lenses 76, 78, 80 and 82 and the variable focusing element 10. In the case of an imaging reader, the solid-state sensor or imager 30 is mounted on a printed circuit board 112 and is operative for receiving the return light passing through the lenses 76, 78, 80 and 82 and the variable focusing element 10 from different imaging planes.

It will be understood that each of the elements described above, or two or more together, also may find a useful application in other types of constructions differinf from the types described above. For example, the lens barrel 72 need not be a coated conductive member with selected areas removed of coating, but could instead be an insulating member, like the cap 74, with selectively plated areas. Also, the cap 74 need not be an insulating member with selected plated areas, but could instead be a coated conductive member, like the lens barrel 72, with selected areas removed of coating. In addition, both the lens barrel 72 and the cap 74 can be coated conductive members with selected areas removed of coating, or both the lens barrel 72 and the cap 74 can be insulating members with selected plated areas.

While the invention has been illustrated and described as embodied in electro-optical lens mounting assemblies and methods in electro-optical readers, it is not intended to be limited to the details shown, since various modifications and structural chalices may be made without departing in any way from the spirit of the present invention. For example, a liquid crystal lens can replace the electrowetting liquid lens. Indeed, any focusing element having electrodes can replace the electrowetting liquid lens.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An electro-optical mounting assembly in an electro-optical reader, comprising:
   a variable focusing element having a pair of electrodes across which a voltage is applied to optically modify light passing along an optical path through the variable focusing element;
   a fixed optical lens;
   a lensholder for holding the fixed lens and the focusing element in a spaced relation along the optical path, the lensholder having a conductive member constituted of an electrically conductive material that directly electrically conductively contacts one of the electrodes and that establishes an electrically conductive path through the conductive member between the one electrode and an exterior of the lensholder, wherein the conductive member is annular and concentric with an optical axis of the fixed optical lens.

2. The assembly of claim 1, wherein the variable focusing element is a liquid lens that includes a liquid having a shape that changes when the voltage is applied.

3. The assembly of claim 1, wherein the conductive member is coated with an electrically insulating coating, except at an interior uncoated surface that is in direct contact with the one electrode, and except at an exterior uncoated surface at the exterior of the lensholder.

4. The assembly of claim 3, wherein the conductive member is a lens barrel in which the fixed lens is mounted, and wherein the lensholder includes a cap mounted on the lens barrel for holding the focusing element between the lens barrel and the cap; and wherein the interior uncoated surface and the exterior uncoated surface are on the lens barrel.

5. The assembly of claim 1, wherein the lensholder includes an insulating member constituted of an electrically insulating material and is plated with an electrically conductive plating at an interior plated surface that is in direct contact with the other of the electrodes, and at an exterior plated surface at the exterior of the lensholder.

6. The assembly of claim 5, wherein the conductive member is a lens barrel in which the fixed lens is mounted, and wherein the insulating member is a cap mounted on the lens barrel for holding the focusing element between the lens barrel and the cap; and wherein the interior plated surface and the exterior plated surface are on the cap.

7. The assembly of claim 1, wherein the conductive member is a lens barrel in which the fixed lens is mounted, and wherein the lensholder includes a cap mounted on the lens barrel for holding the focusing element between the lens barrel and the cap; wherein the lens barrel is coated with an electrically insulating coating, except at an interior uncoated surface that is in direct contact with the one electrode, and except at an exterior uncoated surface at an exterior of the lens barrel; and wherein the cap is constituted of an electrically insulating material and is plated with an electrically conductive plating at an interior plated surface that is in direct contact with the other of the electrodes, and at an exterior plated surface at an exterior of the cap.

8. The assembly of claim 7, wherein the exterior uncoated surface at the exterior of the lens barrel is annular and concentric with the optical path, and wherein the exterior plated surface at the exterior of the cap is annular and concentric with the optical path.

9. The assembly of claim 1, wherein the conductive member is a lens barrel in which the fixed lens is mounted, and wherein the lensholder includes a cap mounted on the lens barrel for holding the focusing element between the lens barrel and the cap, and a resilient washer between the focusing element and the cap for constantly pressing the focusing element against the lens barrel.

10. The assembly of claim 8, and at least one electrically conductive strap for conducting the voltage to one of the annular, exterior, uncoated and plated surfaces without regard to angular position of the lensholder about the optical path.

11. A method of mounting electro-optical components in an electro-optical reader, comprising the steps of:
holding a fixed lens and a variable focusing element having electrodes in a spaced relation along an optical path with a lensholder having a conductive member constituted of an electrically conductive material;
directly electrically conductively contacting one of the electrodes with the conductive member;
establishing an electrically conductive path for conducting a voltage through the conductive member between the one electrode and an exterior of the lensholder, to optically modify light passing along the optical path through the fixed lens and the variable focusing element, wherein the conductive member is annular and concentric with an optical axis of the fixed optical lens.

12. The method of claim 11, and configuring the variable focusing element as a liquid lens that includes a liquid having a shape, and changing the shape of the liquid when the voltage is conducted along the electrically conductive path.

13. The method of claim 11, and coating the conductive member with an electrically insulating coating, except at an interior uncoated surface that is in direct contact with the one electrode, and except at an exterior uncoated surface at the exterior of the lensholder.

14. The method of claim 13, and configuring the conductive member as a lens barrel in which the fixed lens is mounted, and configuring the lensholder with a cap mounted on the lens barrel for holding the focusing element between the lens barrel and the cap; and configuring the interior uncoated surface and the exterior uncoated surface on the lens barrel.

15. The method of claim 11, and configuring the lensholder with an insulating member constituted of an electrically insulating material, and plating the insulating member with an electrically conductive plating at an interior plated surface that is in direct contact with the other of the electrodes, and at an exterior plated surface at the exterior of the lensholder.

16. The method of claim 15, and configuring the conductive member as a lens barrel in which the fixed lens is mounted, and configuring the lensholder with a cap mounted on the lens barrel for holding the focusing element between the lens barrel and the cap; and configuring the interior plated surface and the exterior plated surface on the cap.

17. The method of claim 11, and configuring the conductive member as a lens barrel in which the fixed lens is mounted, and configuring the lensholder with a cap mounted on the lens barrel for holding the focusing element between the lens barrel and the cap; and coating the lens barrel with an electrically insulating coating, except at an interior uncoated surface that is in direct contact with the one electrode, and except at an exterior uncoated surface at an exterior of the lens barrel; and constituting the cap of an electrically insulating material, and plating the cap with an electrically conductive plating at an interior plated surface that is in direct contact with the other of the electrodes, and at an exterior plated surface at an exterior of the cap.

18. The method of claim 17, and configuring the exterior uncoated surface at the exterior of the lens barrel as annular and concentric with the optical path, and configuring the exterior plated surface at the exterior of the cap as annular and concentric with the optical path.

19. The method of claim 11, and configuring the conductive member as a lens barrel in which the fixed lens is mounted, and configuring the lensholder with a cap mounted on the lens barrel for holding the focusing element between the lens barrel and the cap, and constantly pressing the focusing element against the lens barrel with a resilient washer between the focusing element and the cap.

20. The method of claim 18, and conducting the voltage to one of the annular, exterior, uncoated and plated surfaces without regard to angular position of the lensholder about the optical path.

* * * * *

UNITED STATES PATENT AND TRADEMARK OFFICE
CERTIFICATE OF CORRECTION

PATENT NO. : 7,905,407 B2  Page 1 of 1
APPLICATION NO. : 12/313173
DATED : March 15, 2011
INVENTOR(S) : Wittenberg et al.

It is certified that error appears in the above-identified patent and that said Letters Patent is hereby corrected as shown below:

In Column 1, Line 21, delete "all" and insert -- an --, therefor.

In Column 1, Line 67, delete "call" and insert -- can --, therefor.

In Column 2, Line 52, delete "when voltage" and insert -- when a voltage --, therefor.

In Column 2, Line 56, delete "spiced" and insert -- spaced --, therefor.

In Column 4, Line 34, delete "a" and insert -- an --, therefor.

In Column 5, Lines 10-11, delete "alcane, or a blend of alcanes," and insert -- alkane, or a blend of alkanes, --, therefor.

In Column 5, Line 38, delete "all" and insert -- an --, therefor.

In Column 5, Line 56, delete "applied" and insert -- achieved --, therefor.

In Column 6, Line 60, delete "20,.and" and insert -- 20, and --, therefor.

In Column 7, Line 43, delete "20. 23" and insert -- 20, 23 --, therefor.

In Column 7, Line 52, delete "differinf" and insert -- differing --, therefor.

In Column 8, Line 1, delete "chalices" and insert -- changes --, therefor.

Signed and Sealed this
Fourth Day of December, 2012

David J. Kappos
*Director of the United States Patent and Trademark Office*